United States Patent [19]
Sargent et al.

[11] 3,731,490
[45] May 8, 1973

[54] DUAL WASTE DISPOSAL SYSTEM AND METHOD

[75] Inventors: Charles L. Sargent, Ypsilanti; John A. Hoffman, Brighton, both of Mich.

[73] Assignee: Thermasan Corporation, Ann Arbor, Mich.

[22] Filed: Jan. 13, 1972

[21] Appl. No.: 217,585

[52] U.S. Cl............................60/317, 123/1 A, 210/152
[51] Int. Cl..............................F01n 3/02, B07b 3/00
[58] Field of Search ..........................123/1; 60/317; 210/152; 4/131

[56] References Cited

UNITED STATES PATENTS

| | | | |
|---|---|---|---|
| 2,565,720 | 8/1951 | Collison | 4/131 |
| 3,504,797 | 4/1970 | Reid | 123/1 |
| 3,509,999 | 5/1970 | Reid | 210/49 |
| 3,342,337 | 9/1967 | Reid | 210/152 |
| 2,677,234 | 5/1954 | Secord | 60/39.02 |
| 3,633,746 | 1/1972 | Dietrich | 210/71 |
| 3,612,278 | 10/1971 | Dietrich | 210/162 |
| 3,586,170 | 6/1971 | Reid | 210/104 |
| 3,616,913 | 11/1971 | Reid | 210/104 |

*Primary Examiner*—Laurence M. Goodridge
*Assistant Examiner*—Ronald B. Cox
*Attorney*—Olsen and Stephenson

[57] ABSTRACT

Apparatus for and method of disposing of liquid and organic waste materials through the exhaust system of an internal combustion engine wherein the waste materials are collected in two holding tanks from which the materials are metered by two pumps into the exhaust gases from the engine only under controlled conditions. One of the holding tanks is arranged to receive waste materials from a toilet, and the other holding tank is arranged to receive waste materials from sinks, and the like. The pumps are interconnected electrically or mechanically so that they operate simultaneously, and the second pump connected to the second holding tank is arranged to feed substantially greater volumes of waste materials to the exhaust system than the first pump which is connected to the holding tank for the waste materials from the toilet. Pump control means operate the two pumps only in accordance with prescribed conditions relating to the engine and its exhaust system.

12 Claims, 2 Drawing Figures

Patented May 8, 1973   3,731,490

DUAL WASTE DISPOSAL SYSTEM AND METHOD

REFERENCE TO RELATED APPLICATION

The present application relates to the disclosure of pending application of Charles L. Sargent et al., Ser. No. 206,711, filed Dec. 10, 1971, for "Waste Disposal System and Method."

BACKGROUND OF THE INVENTION

The present invention relates generally to improvements in waste disposal systems, and more particularly, to a disposal system especially designed for the disposal simultaneously of human waste materials from a toilet and other waste materials that are discharged from sinks and the like.

Although not limited thereto, the waste disposal system of the present invention has particular utility in recreational vehicles, buses, trucks, motor homes, house trailers, boats, and various other types of vehicles utilized for human transportation. The disposal system may also be used in domestic housing installations or the like where a conventional sewage system is not available.

The invention is particularly applicable to recreational vehicles having internal combustion engines although it is to be understood that the invention has broader applications and may be used with fuel-burning engines that serve to provide propulsion, as well as with fuel-burning engines that are part of a stationary installation. In all of such applications whether the engine is gasoline, Diesel, or a turbine, the liquid and organic waste materials are disposed through the exhaust system of the engine.

Substantial progress has been made recently in the utilization of the waste heat in the exhaust system of a vehicle to dispose of waste materials. Various systems for accomplishing this purpose are disclosed in the aforesaid pending application of Charles L. Sargent et al., Ser. No. 206,711.

In the various embodiments of the invention disclosed in the aforesaid application waste materials are discharged from a holding tank directly into the hot exhaust gases of the internal combustion engine. Controls are provided so that the waste material will be discharged into the exhaust gases only under certain prescribed conditions of operation of the vehicle and the internal combustion engine. The rate at which the waste materials can be discharged into the exhaust gases is limited to values which will assure complete destruction of the bacteria in the waste material and also so that the odors are substantially eliminated and the liquids are converted into superheated steam. In systems of this character, the elmination of the waste materials from the toilet becomes the governing factor so that difficulties are encountered in the disposal of other fluid liquids at an efficient rate. Thus, liquids from wash basins and the like which may be relatively free of organic waste materials must under the prior art systems be fed into the exhaust system at the same rate that is provided for the waste materials from the toilet. In the absence of the toilet waste materials, the waste materials from a wash basin can safely be passed through the exhaust system at a substantially greater rate of feed, but the prior art systems fail to provide adequate means to allow more efficient elimination of waste materials of this character.

SUMMARY OF THE INVENTION

The present invention has overcome the inadequacies that exist in the prior art systems wherein relatively large volumes of waste materials such as water from sinks, wash basins and the like must be disposed of. To accomplish these ends, separate holding tanks are incorporated in the system for waste materials from the toilet and for waste materials from other facilities such as the wash basins, sinks, and the like. The waste material from the two holding tanks are then fed at different rates into the exhaust system so that the limited rate at which the waste materials from the first holding tank can be fed into the system does not unduly restrict the rate at which the waste materials from the second holding tank can be fed into the exhaust system.

According to a preferred embodiment of the present invention, a waste disposal system is provided for use with a rotary combustion engine that discharges waste-heated gases through an exhaust system. The waste disposal system comprises a first waste-holding tank for receiving waste materials from a toilet, a second waste-holding tank for receiving waste materials from sinks and other similar facilities, conduit means in communication with each of said holding tanks and said exhaust system, a first metering pump in said conduit means for pumping waste materials from said first holding tank into the waste-heated gases of said exhaust system, a second metering pump in said conduit means for pumping waste materials from said second holding tank into the waste-heated gases of the said exhaust system, and pump control means responsive to conditions of operation of said internal combustion engine and its exhaust system for operating said pumps simultaneously at selected rates of feed when said conditions of operation are within selected ranges.

The invention also discloses a method of disposing of liquid and organic waste materials through the exhaust system of an internal combustion engine comprising the steps of collecting in separate chambers toilet waste materials and sink waste materials, sensing selected conditions relating to the internal combustion engine, and feeding simultaneously the toilet and sink waste materials into the exhaust system at different but selected controlled rates only when the sensed conditions are within selected ranges.

In the apparatus and method disclosed, the materials that are fed from the sink waste tank are fed into the exhaust system at approximately ten times the rate of feeding the waste materials from the toilet holding tank.

Thus, it is an object of the present invention to provide improved method and apparatus for more efficiently disposing of liquid and organic waste materials from systems wherein substantial volumes of liquids that are relativelely free of organic matter are to be removed from the system.

Other objects of this invention will appear in the following description and appended claims, reference being had to the accompanying drawings forming a part of this specification wherein like reference characters designate corresponding parts in the several views.

Figures 1, 2:
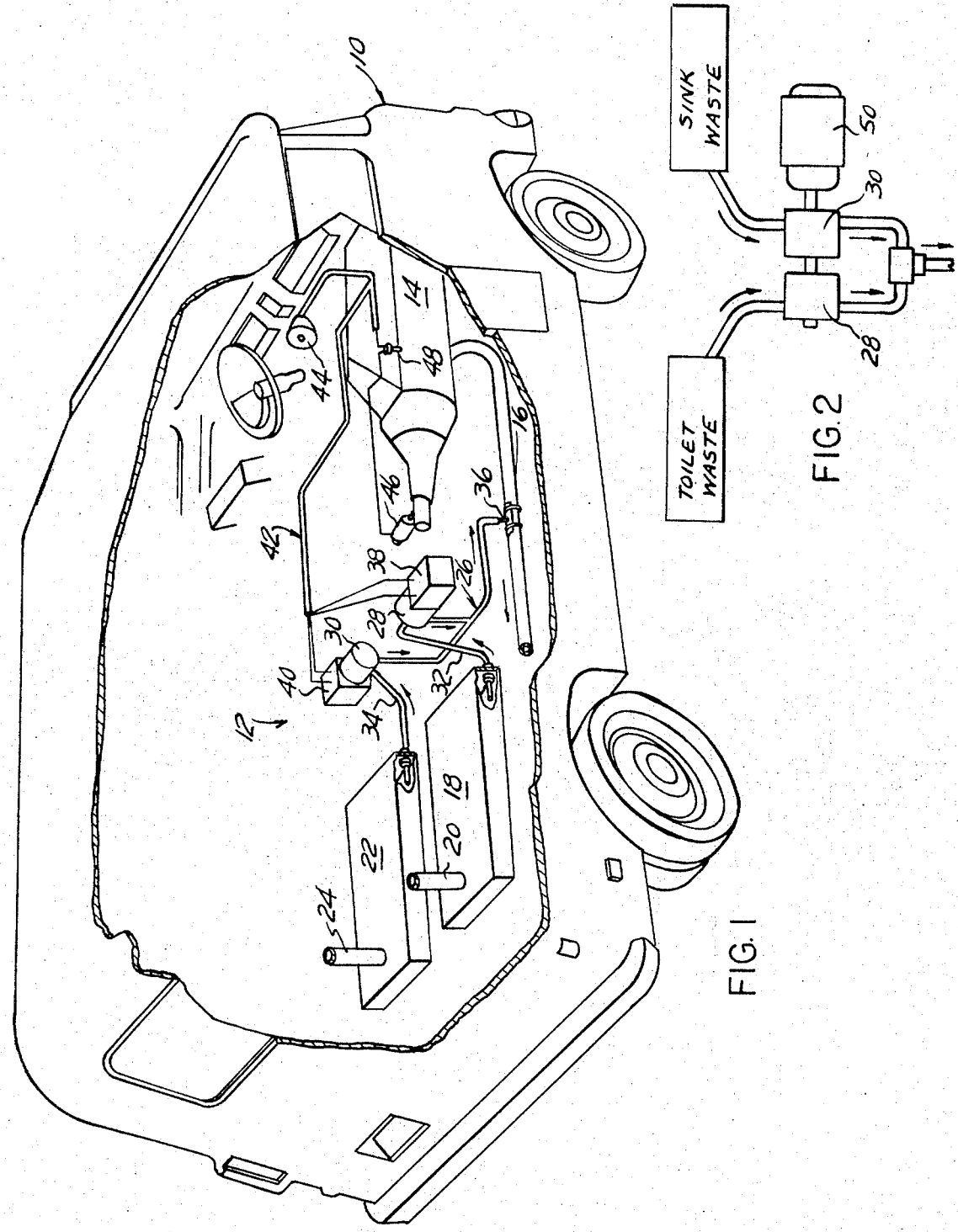
FIG. 1 is a fragmentary perspective view of a motor vehicle containing a preferred embodiment of the present invention.
FIG. 2 is a schematic illustration of a modified arrangement for operating the metering pumps in the embodiment illustrated in FIG. 1.

DESCRIPTION OF THE PREFERRED EMBODIMENTS.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. Initially, the embodiment of the invention illustrated in FIG. 1 will be described. As there shown, a motor vehicle 10 includes the waste disposal system 12, and it has a conventional internal combustion engine 14 with an exhaust pipe 16 which is part of the exhaust system of engine 14. The waste disposal system 12 includes a first waste-holding tank 18 adapted to receive waste material from a toilet through the inlet conduit 20, and a second waste-holding tank 22 adapted to receive waste material from sinks, wash basins and other similar facilities through the inlet conduit 24. Conduit means 26 are in communication with each of said holding tanks 18 and 22 and with the exhaust pipe 16 which is part of the exhaust system for the vehicle 10. A first metering pump 28 is in said conduit means 26 for pumping waste materials from the first holding tank 18 into the waste-heated gases of the exhaust system, and a second metering pump 30 is in said conduit means 26 for pumping waste materials from the second holding tank 22 into the waste-heated gases of the exhaust system. It will be observed that the conduit means 26 has one branch 32 which is in communication with the first holding tank 18 and a second branch 34 which is in communication with the second holding tank 22. These branches unite prior to reaching the exhaust pipe 16 downstream from the two metering pumps 28 and 30 so that the materials that are discharged from the pumps 28 and 30 will be mixed and will be discharged together into the exhaust pipe 16 at the single outlet means 36 of the conduit means 26. Suitable motor means are provided for driving each of the metering pumps 28 and 30. In the illustrated embodiment electric motors 38 and 40 are provided for this purpose. As previously indicated, it is desired that the pump 30 feed substantially greater volumes of waste material to the exhaust system than will be fed by the pump 28. Various arrangements can be provided for accomplishing this end. It is found that the most desirable results are realized when the pump 30 will have a capacity approximately ten times greater than that of the pump 28. If the motors 38 and 40 have the same rated revolutions per minute, then it will be necessary that the pump 28 include a gear reduction ratio that is ten times greater than that of pump 30. If desired, the pump 30 can be arranged to rotate at the same speed as the pump 28, but in this situation it will be necessary that the capacity of the pump be ten times greater than that of the pump 28. It will be understood by those skilled in the art that various other arrangements can be provided for reaching this result.

Control means for operating the pumps 28 and 30 are provided which are substantially the same as is disclosed in the aforesaid copending application Ser. No.206,711 , and for more detailed description of the control means, reference is made to the pending application. Briefly, the pump control means illustrated in the described embodiment includes the control box 44, a speed sensing element and switch 46, and a temperature sensing element 48 which is a vacuum switch in the intake manifold of the engine where the extent of vacuum will indicate load on the engine and thereby the temperature and volume of the exhaust gases in the pipe 16.

The two sensing elements are electrically in series with the control box 34 so that until such time as the sensing elements indicate that required conditions have been met, the control box will prevent the circuit containing the electric motors 38 and 40 from being energized from a source of electric energy, not shown.

For a more detailed description of the control means 42, reference is made to the aforesaid copending application. Reference is also made to this application for a more detailed description of the outlet means 36 through which the waste materials are discharged into the exhaust pipe 16.

From the foregoing description, it will be understood that a method has been provided for disposing of liquid and organic waste materials through the exhaust system of the internal combustion engine 14 which comprises the steps of initially collecting in the separate chambers 18 and 22 waste materials from a toilet and a sink, and the sensing elements 46 and 48 sense selected conditions relating to the internal combustion engine, and thereafter when condtions are properly met the pumps 28 and 30 simultaneously feed the toilet and sink waste materials into the exhaust system at different but selected controlled rates.

Attention is now directed to the modified form of the invention shown in FIG. 2. As there shown, a single electric motor 50 is provided for simultaneously operating the two metering pumps 28 and 30. In an arrangement such as this the metering pump 28 will include gearing which will allow waste materials to be metered to the exhaust pipe 16 at one-tenth the rate that the waste materials can be metered by the pump 30. This embodiment has an advantage over the embodiment illustrated in FIG. 1 in that one electric motor is required to operate the dual system.

In both forms of the invention disclosed, either pump 28 or 30 will continue to discharge waste materials from its associated holding tank when the prescribed conditions sensed by elements 46 and 48 are met even though the other pump 28 or 30 is turning freely but not pumping because its associated holding tank is empty.

It is claimed:

1. A method of disposing of liquid and organic waste materials through the exhaust system of an internal combustion engine, comprising the steps of collecting in separate chambers toilet waste materials and sink waste materials, sensing selected conditions relating to the internal combustion engine, and feeding the toilet and sink waste materials into the exhaust system at different but selected controlled rates only when the sensed conditions are within preselected ranges.

2. The method that is defined in claim 1, wherein said toilet and sink waste materials are fed at rates of approximately ten parts per volume of the sink waste materials to one part per volume of the toilet waste materials.

3. The method that is defined in claim 1, wherein the toilet waste materials and the sink waste materials are mixed and fed through a common inlet into said exhaust system.

4. The method that is defined in claim 1, wherein one of said toilet and sink waste materials is fed into the exhaust system at its selected controlled rate when the sensed conditions are within said preselected ranges if the supply of the other of said waste materials is expended.

5. The method that is defined in claim 1, wherein said waste materials are fed into said exhaust system by a common motor means.

6. The method that is defined in claim 1, wherein said waste materials are fed into said exhaust system by separate motor means.

7. A waste disposal system for use with a rotary internal combustion engine that discharges waste-heated gases through an exhaust system, said waste disposal system comprising a first waste-holding tank for receiving waste materials from a toilet, a second waste-holding tank for receiving waste materials from sinks and other similar facilities, conduit means in communication with each of said holding tanks and said exhaust system, a first metering pump in said conduit means for pumping waste materials from said first holding tank into the waste-heated gases of said exhaust system, a second metering pump in said conduit means for pumping waste materials from said second holding tank into the waste-heated gases of said exhaust system, and pump control means responsive to conditions of operation of said internal combustion engine and its exhaust system for operating said pumps simultaneously at selected rates of feed when said conditions of operation are within selected ranges.

8. The waste disposal system that is defined in claim 7, wherein said conduit means has a single outlet means for discharging waste materials into the waste-heated gases of said exhaust system, said first and second metering pumps being in communication with said single outlet means.

9. The waste disposal system that is defined in claim 7, wherein said first and second metering pumps are driven by a common motor.

10. The waste disposal system that is defined in claim 7, wherein said first and second metering pumps are driven by separate motors.

11. The waste disposal system that is defined in claim 7, wherein said first and second metering pumps are interconnected so that said second metering pump feeds approximately 10 volumes of waste material from the second holding tank to the exhaust system for each one volume of waste material fed by the first metering pump from the first holding tank to the exhaust system.

12. The waste disposal system that is defined in claim 7, wherein said pump control means are responsive to conditions indicating the rate of revolution of the internal combustion engine and the temperature of the waste-heated gases into which the waste materials are fed.

* * * * *